(12) United States Patent
Frota de Souza Filho

(10) Patent No.: US 9,579,730 B2
(45) Date of Patent: Feb. 28, 2017

(54) VIBRATION ABSORBER WITH HIGH VISCOUS DAMPENING

(71) Applicant: Kennametal Inc., Latrobe, PA (US)

(72) Inventor: Ruy Frota de Souza Filho, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 305 days.

(21) Appl. No.: 14/319,643

(22) Filed: Jun. 30, 2014

(65) Prior Publication Data
US 2015/0375304 A1    Dec. 31, 2015

(51) Int. Cl.
*B23B 29/02* (2006.01)
*B23B 27/00* (2006.01)

(52) U.S. Cl.
CPC .......... *B23B 29/022* (2013.01); *B23B 27/002* (2013.01); *B23B 27/007* (2013.01); *B23B 2250/16* (2013.01); *Y10T 408/76* (2015.01)

(58) Field of Classification Search
CPC ..... B23B 29/022; B23B 27/002; B23C 5/003; B23C 2250/04; B23C 2250/16; Y10T 408/76
See application file for complete search history.

(56) References Cited

U.S. PATENT DOCUMENTS

| | | |
|---|---|---|
| 2,051,954 A | 8/1936 | Leland |
| 2,591,115 A | 4/1952 | Austin |
| 3,164,041 A | 1/1965 | Carlstedt |
| 3,207,009 A | 9/1965 | Carlstedt |
| 3,207,014 A | 9/1965 | Carlstedt |
| 3,230,833 A | 1/1966 | Shurtliff |
| 3,242,791 A | 3/1966 | Smith |
| 3,447,402 A | 6/1969 | Ray |
| 3,559,512 A | 2/1971 | Aggarwal |
| 3,582,226 A | 6/1971 | Shurtliff |
| 3,598,498 A | 8/1971 | Holmen |
| 3,643,546 A | 2/1972 | Richter et al. |
| 3,774,730 A | 11/1973 | Maddux |

(Continued)

FOREIGN PATENT DOCUMENTS

| | | | |
|---|---|---|---|
| CN | 103433762 A | 12/2013 | |
| DE | 102010063725 | * 6/2012 | ............ B22F 3/1055 |

(Continued)

*Primary Examiner* — Daniel Howell
(74) *Attorney, Agent, or Firm* — Matthew S. Bedsole

(57) ABSTRACT

A tunable or tuned boring tool having a dynamic vibration absorber is provided herein. The boring tool includes a boring bar having a distal portion configured to support a tool, a proximal portion configured for attachment to a support structure of a metalworking machine, and a cylindrical body extending between the proximal portion and the distal portion, having an elongated cavity therein. The boring tool further includes a tuned or tunable absorber inserted in the cavity of the boring bar. The absorber includes an absorber mass, an annular or partially annular support circumscribing each end of the absorber mass for holding the absorber mass within the cavity, and a layer of fluid restricting material surrounding at least a central portion of the absorber mass for dampening vibration of the absorber mass. A method of forming a boring tool with a dynamic vibration absorber is also provided herein.

16 Claims, 12 Drawing Sheets

(56) References Cited

U.S. PATENT DOCUMENTS

| | | | |
|---|---|---|---|
| 3,838,936 A | | 10/1974 | Andreassen et al. |
| 4,553,884 A | | 11/1985 | Fitzgerald et al. |
| 4,817,003 A | | 3/1989 | Nagase et al. |
| 5,413,318 A | | 5/1995 | Andreassen |
| 5,518,347 A | | 5/1996 | Cobb, Jr. |
| 5,700,116 A | | 12/1997 | Cobb, Jr. |
| 5,810,528 A | | 9/1998 | O'Connor et al. |
| 6,443,673 B1 | | 9/2002 | Etling et al. |
| 6,935,816 B2 | | 8/2005 | Lee et al. |
| 7,234,379 B2 | * | 6/2007 | Claesson ............... B23B 27/002 188/380 |
| 7,661,912 B2 | * | 2/2010 | Onozuka ............... B23B 29/022 188/322.5 |
| 8,308,404 B2 | * | 11/2012 | Ostermann ........... B23B 29/022 408/143 |
| 8,899,891 B2 | * | 12/2014 | Freyermuth .......... B23B 27/002 279/20 |
| 9,079,256 B2 | * | 7/2015 | Freyermuth ............ B23B 31/02 |
| 2003/0147707 A1 | | 8/2003 | Perkowski |
| 2010/0096228 A1 | | 4/2010 | Digernes et al. |

FOREIGN PATENT DOCUMENTS

| | | |
|---|---|---|
| GB | 1029675 | 5/1966 |
| GB | 1179217 | 1/1970 |
| GB | 1306157 | 2/1973 |
| SU | 663493 A2 | 5/1979 |

\* cited by examiner

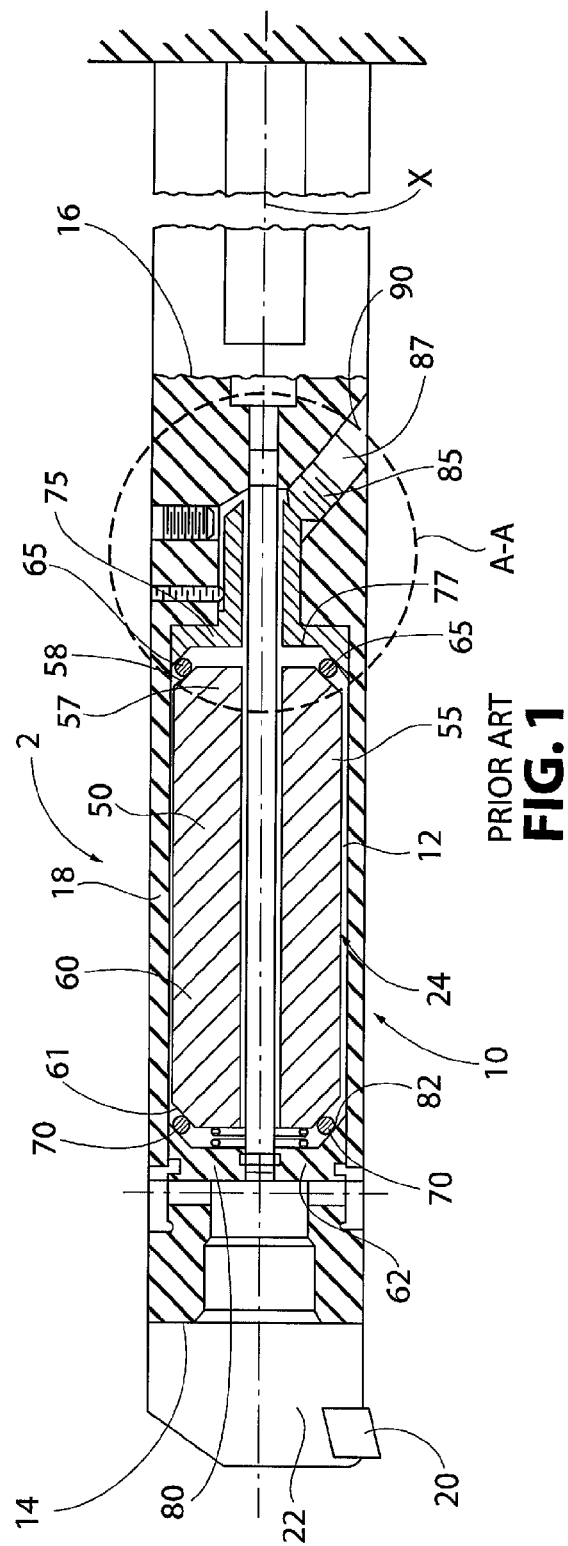
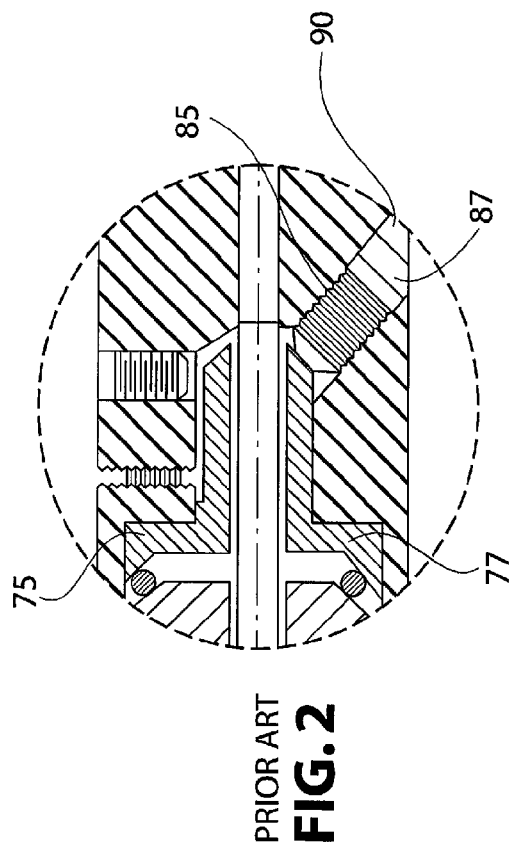
PRIOR ART
FIG. 1
PRIOR ART
FIG. 2

VIBRATION ABSORBER WITH HIGH VISCOUS DAMPENING

BACKGROUND OF THE INVENTION

Field of the Invention

This invention relates to a tuned or tunable boring tool for suppressing vibrations caused in machining processes and, more particularly, to a tuned or tunable boring tool that utilizes a dynamic vibration absorber.

Description of Related Art

During a metalworking operation, there is relative motion between a workpiece and a cutting tool being urged against the workpiece. Specifically, the surface finish left on the workpiece by a previous pass of the cutting tool creates variation in chip thickness that, in turn, creates fluctuation of the cutting force magnitude. The relative motion between the workpiece and the tool is magnified by this fluctuation of the cutting force and may lead to an unstable condition known as chatter. Chatter is an example of self-excited vibration. As a result of this vibration, a poor quality surface finish and an out-of-tolerance finished workpiece may be produced.

Chatter may be especially problematic when the cutting tool is coupled to an elongated boring bar. A boring bar is essentially a cantilevered member that is anchored at one end and attached to the cutting tool at the other end. Boring bars are conventionally formed from a metal, such as carbon steel. To reduce vibrations of the boring bars, cutting parameters such as speed and depth of cut may be reduced, decreasing the metal removal rate. However, this approach interferes with production output, leading to low productivity.

Numerous attempts to eliminate boring bar vibration are known. One method for reducing vibration is using a boring bar fabricated from a stiffer material, such as carbide (e.g., tungsten carbide). However, carbide boring bars are more expensive than conventional steel bars. Furthermore, with carbide boring bars, although chatter and vibration are reduced by the inherently high stiffness of the carbide bar, vibration may still build to an unacceptable level. Additionally, carbide is fairly brittle and a minor impact upon the boring bar during use or setup may inadvertently damage the bar. A carbide boring bar extending between a steel adapter and steel tip portion is disclosed in U.S. Pat. No. 6,935,816 to Lee et al.

Another attempt to reduce vibration in boring bars involves attaching a dynamic vibration absorber mechanism to or within the boring bar. The dynamic vibration absorber may be designed to vibrate at a particular predetermined frequency to cancel vibration of the cantilevered bar. The dynamic vibration absorber may also include various mechanisms for tuning the bar, for particular applications.

A dynamic vibration absorber for use in a tunable boring bar, comprised of a cylindrical mass of a high-density material supported on resilient bushings, is disclosed in U.S. Pat. No. 3,774,730. When optimally tuned, the mass oscillates in response to vibration produced in the boring bar to cancel out vibration. The absorber may be tuned to accommodate the boring bar for the changes in the length of the boring bar and the weight of the cutting tool connected at the end of the bar. Such an adjustment is made by longitudinally urging pressure plates at opposing ends of the cylindrical mass, thereby compressing the rubber bushings against the mass, which alters the fore of the rubber supports against the mass to change the vibration frequency of the cylindrical mass. Generally, the process of tuning the boring bar is easier for boring bars having higher natural frequencies, where smaller tuning masses can be applied. Therefore, shorter and stiffer bars are typically easier to tune than longer more flexible bars.

Tunable boring bars are typically formed from materials that can be machined, such as carbon steel, so that the bar can be fitted to accommodate the vibration absorption mechanism. Therefore, tunable boring bars generally are not made from stiffer materials, such as carbide, which cannot be machined through conventional means. In addition to tunable boring bars, some boring bars are designed with internal vibration absorber mechanisms that are not tunable. These anti-vibration bars will be referred to as AVB bars.

However, even tunable boring bars and AVB bars may not produce satisfactory performance for boring bars with narrower diameters and longer lengths. This limitation is problematic since, for certain cutting applications, narrow long length boring bars are particularly desirable. Therefore, there is a need for a tuned or tunable boring bar with improved vibration absorption.

SUMMARY OF THE INVENTION

A tunable or tuned boring tool having a dynamic vibration absorber is provided herein. The boring tool includes a boring bar having a distal portion configured to support a tool, a proximal portion configured for attachment to a support structure of a metalworking machine, and a cylindrical body extending between the proximal portion and the distal portion having an elongated cavity therein with fluid sealed within at least a portion of the cavity. The boring tool further includes a tuned or tunable absorber within the cavity of the boring bar. The absorber includes an absorber mass, an annular or partially annular support circumscribing each end of the absorber mass for holding the absorber mass within the cavity, and a layer of fluid restricting material surrounding at least a central portion of the absorber mass and immersed in the fluid, which in conjunction with the fluid, dampens vibration of the absorber mass. In another aspect of the invention, the supports circumscribing each end of the absorber mass are replaced with fluid restricting material such that the mass is supported by the fluid restricting material to provide a tunable of tuned boring tool.

According to another aspect of the invention, a method of forming a tuned or tunable boring tool is provided. The method includes providing a boring bar having a distal portion configured to support a tool, a proximal portion configured for attachment to a support structure of a metalworking machine, and a cylindrical body extending between the proximal portion and the distal portion, having an elongated cavity therein. The method further includes providing a tuned or tunable vibration absorber comprising an absorber mass, an annular or partially annular support circumscribing each end of the absorber mass for holding the absorber mass within the cavity, and a layer of fluid restricting material surrounding at least a central portion of the absorber mass for dampening vibration of the absorber mass. The method further includes the steps of: mounting the vibration absorber into the cavity of the boring bar; mounting a cutting tool to the distal end of the boring bar; and securing the proximal end of the boring bar to a mounting structure of a metalworking machine. In another aspect of the invention, the supports circumscribing each end of the mass may be replaced with fluid restricting material such that the mass is supported by the fluid restricting material to provide a tunable or tuned boring tool.

BRIEF DESCRIPTION OF THE DRAWINGS

Some of the advantages and features of the preferred embodiments of the invention have been summarized hereinabove. These embodiments, along with other potential embodiments of the device, will become apparent to those skilled in the art when referencing the following drawings in conjunction with the detailed descriptions as they relate to the figures.

FIG. 1 is a schematic drawing of a tunable boring tool, as is known in the prior art;

FIG. 2 is an expanded view of the boring tool of FIG. 1 from the encircled area labeled A-A, as is known in the prior art;

DESCRIPTION OF THE INVENTION

Figure 3:
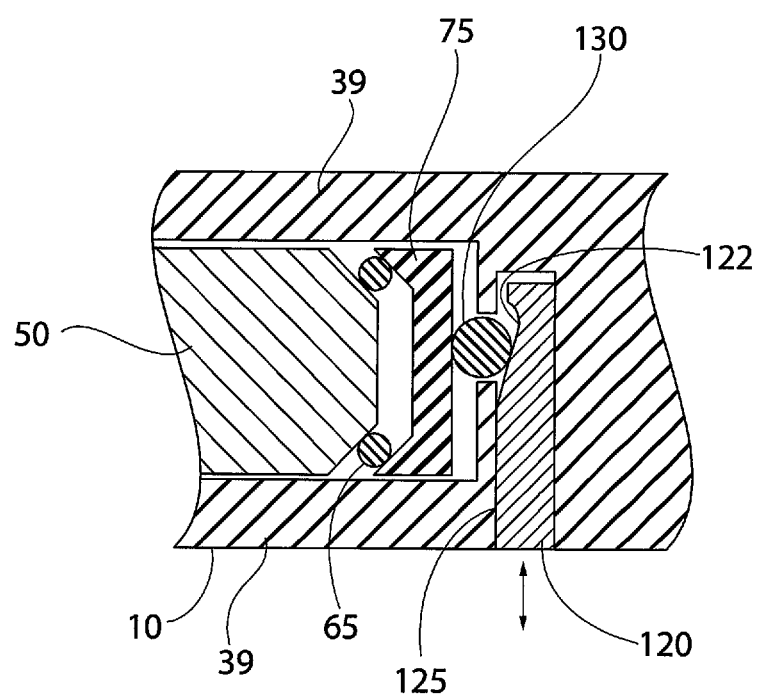
FIG. 3 is an expanded view of another embodiment of a tunable boring tool, as is known in the prior art.

For purposes of the description hereinafter, spatial orientation terms, if used, shall relate to the referenced embodiment as it is oriented in the accompanying drawing figures or otherwise described in the following detailed description.

However, it is to be understood that the embodiments described hereinafter may assume many alternative variations and embodiments. It is also to be understood that the specific devices illustrated in the accompanying drawing figures and described herein are simply exemplary and should not be considered as limiting.

The present invention is directed to a vibration absorber configured for use with a tuned or tunable boring tool. The vibration absorber is a dynamic vibration absorber that oscillates in response to vibration of the boring bar. To facilitate discussion, a boring tool 2, including the vibration absorber and boring bar, as is known in the prior art, will now be described.

With reference to FIGS. 1 and 2, a boring tool 2, as is known in the prior art, is illustrated. The boring tool 2 includes a boring bar 10 with a central cavity 12 extending inwardly from the distal end 14 of the boring bar 10. The boring bar 10 includes a body 18, such as a steel shank, extending between a proximal end 16 and distal end 14 of the bar 10. The proximal end 16 of the boring bar 10 may be fixedly connected to a supporting structure, such as a supporting structure of a metalworking machine (not shown). Thus, the boring bar 10 is a cantilevered beam, in which the proximal end 16 is secured to the supporting structure, and the distal end 14 is free. A cutting tool, such as a cutting insert 20, is mounted in a conventional manner to a boring bar head 22 positioned at the distal end 14 of the body 18. Steel boring bars 10 are commercially available from a number of manufacturers, including Kennametal Inc., of Latrobe, Pa. Kennametal manufactures steel, tunable boring bars with a diameter of about 25 mm to 100 mm. The useful or unsupported length of the bar is dependent on the specific application, but is generally between 6 and 10 times the outer diameter of the bar 10.

As discussed herein, use of the boring bar 10 on a workpiece in a metalworking operation will produce vibrations that may deteriorate the surface finish and dimensional tolerance of the workpiece. For this reason, the boring tool 2 is provided with a dynamic vibration absorber 24 that dampens the vibrations generated in the boring bar 10.

The dynamic vibration absorber 24 is installed within the central cavity 12 of the body 18. The vibration absorber 24 includes a generally cylindrical mass 50 having a first end 55 with an end portion 57 and a second end 60 with an end portion 62. Each end portion 57,62 has an outwardly facing conical surface 58,61. A first elastomer support 65 and a second elastomer support 70 circumscribe the conical surface 58 on the first end 55 and the conical surface 61 on the second end 60, respectively, of the absorber mass 50. A first pressure plate 75 and a second pressure plate 80 are positioned within the central cavity 12 proximate to the end portions 57, 62 of the absorber mass 50. The first pressure plate 75 has an inwardly facing conical surface 77 while the second pressure plate 80 also has an inwardly facing conical surface 82. Each pressure plate 75, 80 surrounds an elastomer support 65,70 such that the inwardly facing conical surfaces 77, 82 of the pressure plates 75, 80 urge each elastomer support 65, 70 against the respective conical surface 58, 61 of the first end 55 and the second end 60 of the absorber mass 50.

The first pressure plate 75 is movable within the central cavity 12 along the longitudinal axis X. A positioning member, such as an adjusting screw 85, may be used to adjust the compression of the elastomer supports 65, 70 against the absorber mass 50. As a positioning member, the adjusting screw 85 extends through a bore 90 from the outer surface of boring bar 10 to contact the first pressure plate 75.

The adjusting screw 85 is threadably mated with the bore 90 such that the rotation of the adjusting screw 85 at a screw head 87 urges a contact end of the adjusting screw 85 against or away from the first pressure plate 75, thereby displacing the first pressure plate 75 along the longitudinal axis X to increase or decrease the compression of the elastomer supports 65, 70.

To tune the subject boring bar 10, an operator monitors the vibration of the boring bar 10 and tightens or loosens the adjusting screw 85, thereby adjusting the force of the elastomer supports 65, 70 against the absorber mass 50. Alternatively, it is also possible to predefine the amount of compression necessary on the elastomer supports 65, 70 against the absorber mass 50 to minimize vibration under different tool conditions. In this manner, a machine operator may adjust the compressive force of the elastomer supports 65, 70 to predetermine levels for tuning.

Alternate mechanisms for tuning the dynamic vibration absorber of the boring tool 2 are also known. For example, with reference to FIG. 3, a further embodiment of a boring tool including a boring bar 10 and vibration absorber is illustrated, which uses a ball 130 or support rather than an adjustable screw to modify the position of the mass 50. The mechanism for adjusting or tuning the boring bar 10 includes a wedge 120 that is radially positioned within a hole 125 or slot extending through a cavity wall 39 of the boring bar 10. A ramp 122 on the wedge 120 longitudinally displaces the ball 130 against the surface of a moveable pressure plate 75, thereby urging the moveable pressure plate 75 against the elastomer support 65 to adjust compression on the support 65. As in previously described embodiments, adjusting the compressive force of the elastomer support 65 adjusts the vibration frequency of the mass 50 thereby tuning the boring tool 2 to minimize vibration for boring bars 10 of particular lengths.

Having generally described the structure and operation of a boring tool 2 and dynamic vibration absorber 24 as is known in the prior art, the dynamic vibration absorber of the present invention will now be described in detail.

Figure 4:
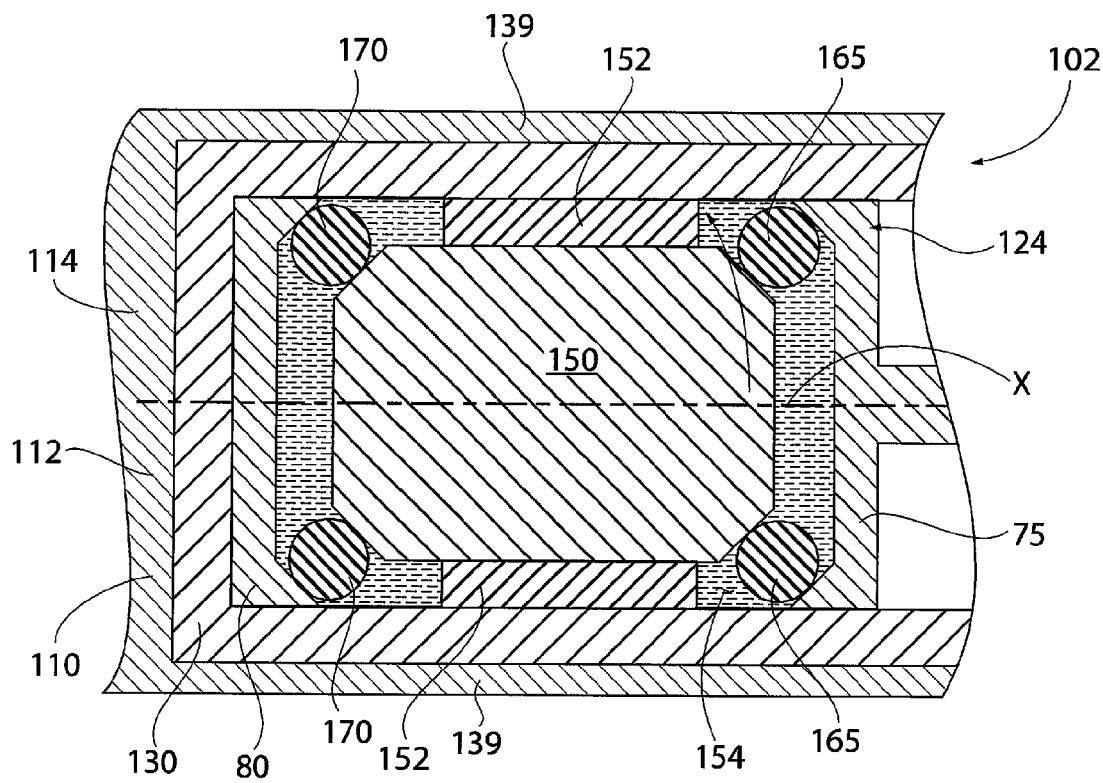
FIG. 4 is a cross section view of a portion of a tunable boring tool, according to a further embodiment.

With reference to FIG. 4, a portion of a tunable boring tool 102 including a boring bar 110 and dynamic vibration absorber 124 is illustrated. A cutting tool or cutting element (shown in FIG. 1) may be attached to the distal end 114 of the boring bar 110. As in previous embodiments, the dynamic vibration absorber 124 includes a mass 150 positioned in a cavity 112 of the boring bar 110. The center of the mass 150 generally extends along the longitudinal axis X of the boring bar 110. The pressure plates 75, 80 move along the longitudinal axis X. Vibration of the boring bar 110 excites the mass 150, which is intended to be tuned to vibrate independently at a different frequency, thereby minimizing or cancelling the vibration of the boring bar 110. The mass 150 is held in place by one or more supports 165, 170. For example, the supports may be elastomeric rings positioned at the ends of the mass 150 and configured to maintain the mass within the cavity 112 and free from contact with sidewalls 139 of the cavity 112. Adjusting the compressive force of the supports 165, 170 against the mass 150 changes the vibration frequency of the mass 150 so that the mass 150 oscillates at a frequency that cancels or minimizes overall vibration of the bar 110.

As shown in FIG. 4, the mass 150 is surrounded by a layer of fluid restricting material, referred to hereinafter as a layer 152 of fluid restricting material. The layer 152 of fluid restricting material may be a compressible, porous material having open cells that are capable of being filled with a fluid. For example, the layer 152 of fluid restricting material may be a sponge, a foam, a gel, or any combination thereof. In a preferred and non-limiting embodiment, the layer 152 of fluid restricting material is an open cell type foam, such as a polyurethane foam, a polystyrene foam, or a foam formed from phenolic resins. Additionally, as will be described hereinafter, the vibration absorbing layer may be a non-porous but resilient material and have passageways extending completely therethrough in either the axial or radial directions.

The layer 152 of fluid restricting material may be arranged around the mass 150 in numerous configurations depending on the dampening requirements for particular applications. In one embodiment, as shown in FIG. 4, the layer 152 is an annular or partially annular structure that surrounds a portion of the mass 150. Alternative configurations for the vibration absorbing layer are illustrated in FIGS. 5-9.

Referring to FIG. 4, the vibration absorber 124 may optionally be mounted directly within the cavity 112 of the boring bar 110 or may include an external housing, such as a canister 130. The canister 130 may be formed from metal, synthetic polymers, or any other suitably strong material. The canister 130 may be a tubular body, which may be cylindrical, defining an interior of sufficient length and width to accommodate the absorber mass 150 and layer 152 of a fluid restricting material. The fluid restricting material may be a porous material whereby the composition of the material is permeable to fluid or may be a non-porous material with passageways extending therethrough to allow limited flow through the material. Porous materials will be discussed initially.

The canister 130 can be inserted directly into the cavity 112 of the boring bar 110 for providing vibration dampening for the bar 110. In a preferred and non-limiting embodiment, the canister 130 may be filled with a high viscosity flowable material or fluid 154. The fluid 154 is capable of impregnating or diffusing into the layer 152 of fluid restricting material to increase the dampening force of the layer 152 of fluid restricting material. The fluid 154 may be any type of high viscosity flowable material capable of being absorbed by the layer 152 of fluid restricting material. For example, natural or synthetic oils may be used. Any fluid, including water, may be used. However, depending upon the level of damping that is desired, the fluid having a higher viscosity that water may be desired.

When the vibration absorber 124 is in use, the absorber mass 150 vibrates at a frequency close to the frequency of the most dominant mode of the vibrating boring bar 110. With the movement of the absorber mass 150, the fluid 154 is forced through the porous material creating friction and dissipating vibration energy from the absorber mass 150. More specifically, as the mass 150 moves within the canister 130, opposing portions of the layer 152 of fluid restricting material are alternatively compressed and expanded. As a portion of the layer 152 of fluid restricting material is compressed, fluid 154 is forced from that portion of the layer 152. The expelled fluid 154 can be absorbed by the expanded portions of the layer 152. In this way, the fluid 154 moves through the absorbing layer 152 in a back and forth direction. Movement of the fluid effectively dissipates energy from the mass 150, thereby dampening vibration of the mass 150. As a result of this back and forth motion, the absorber 124 provides dampening at high frequencies and/or higher vibration amplitudes, such as would occur during certain machining conditions.

The vibration absorber 124 depicted in FIG. 4 is a vibration absorber 124 for use with a tunable boring bar. The vibration absorber 124 may be tuned using one of the tuning mechanisms illustrated in FIGS. 1-3 to increase or decrease compression of the elastomer supports 165, 170 against the mass 150. However, as will be appreciated by one having ordinary skill in the art, the vibration absorber 124 may also be used with a pre-tuned boring bar to cancel or minimize vibration for a bar of a specific length, diameter, and material composition. In that case, the compression of the supports 165, 170 and position of the pressure plates 75, 80 is predetermined. The absorber 124 effectively cancels or minimizes vibration for a particular natural frequency of vibration.

Figure 5A:
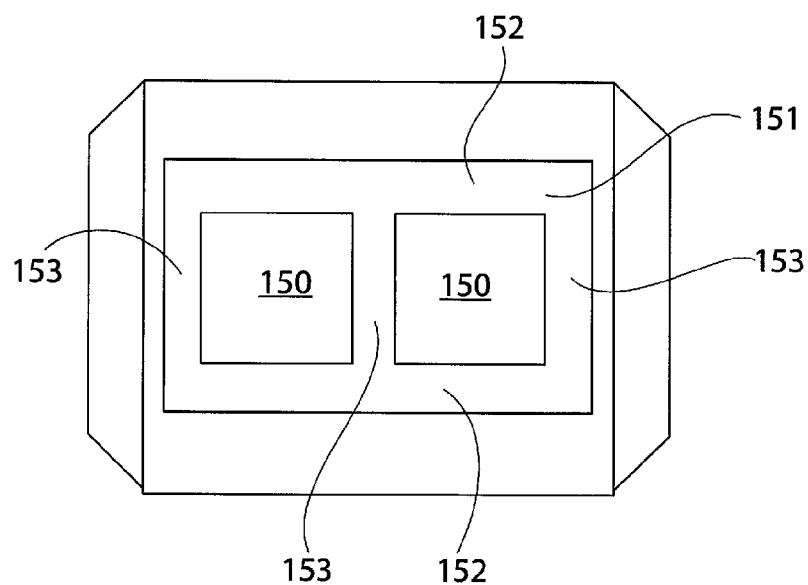
FIG. 5A is a side view of a mass and vibration absorbing layer of a dynamic absorber having a layer of a porous fluid restricting material, according to a further embodiment.
Figure 6A:
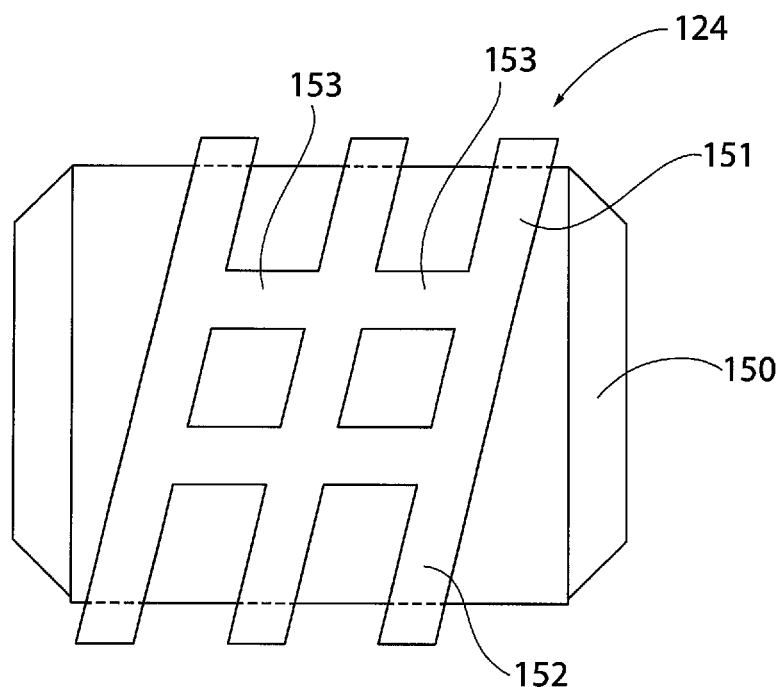
FIG. 6A is a side view of a mass and vibration absorbing layer of a dynamic absorber having a layer of a porous fluid restricting material, according to a further embodiment.

Having described an embodiment in which an annular or partially annular layer 152 of fluid restricting material surrounds the mass 150, alternative arrangements for the layer 152 and mass 150 will now be discussed. With reference to FIG. 5A, the layer 152 may be provided as narrow strips 151 with connectors 153 therebetween extending longitudinally along the mass 150. With reference to FIG. 6A, in a further embodiment of the dynamic absorber 124, the layer 152 of fluid restricting material is a narrow strip 151 of material with longitudinal connectors 153 therebetween wrapped around the mass 150 in a helical pattern. Using a thin strip of material may reduce production costs, as a lower volume of fluid restricting material is needed to obtain the above-described results.

Figure 7A:
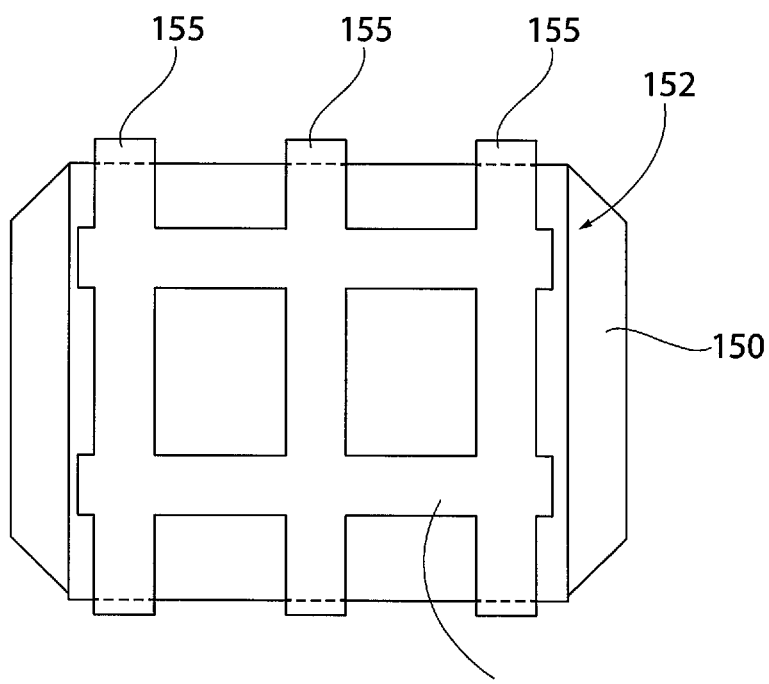
FIG. 7A is a side view of a mass and vibration absorbing layer of a dynamic absorber having a layer of a porous fluid restricting material, according to a further embodiment.

With reference to FIG. 7A, in a further embodiment, the layer 152 of fluid restricting material is divided into a plurality of rings 155 with connectors 153 therebetween surrounding the mass 150. The rings 155 may be placed at equidistant locations along the outer surface of the mass 150. The rings may also be arranged so that greater vibration dampening is provided along portions of the vibrating mass 150 that are exposed to the greatest vibration force. For example, a greater number of rings of the layer 152 of fluid restricting material may be positioned near the proximal end of the boring bar 110, specifically the portion of the bar 110 that is secured to the supporting structure or metalworking machine.

Figure 5B:
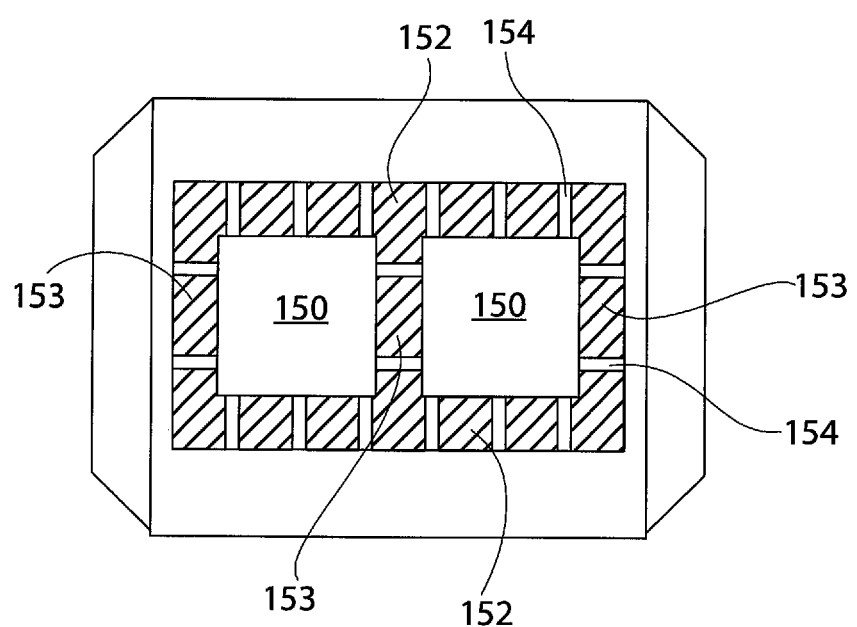
FIG. 5B is a side view of a mass and vibration absorbing layer of a dynamic absorber having a layer of a non-porous fluid restricting material with passageways extending therethrough, according to a further embodiment.
Figure 6B:
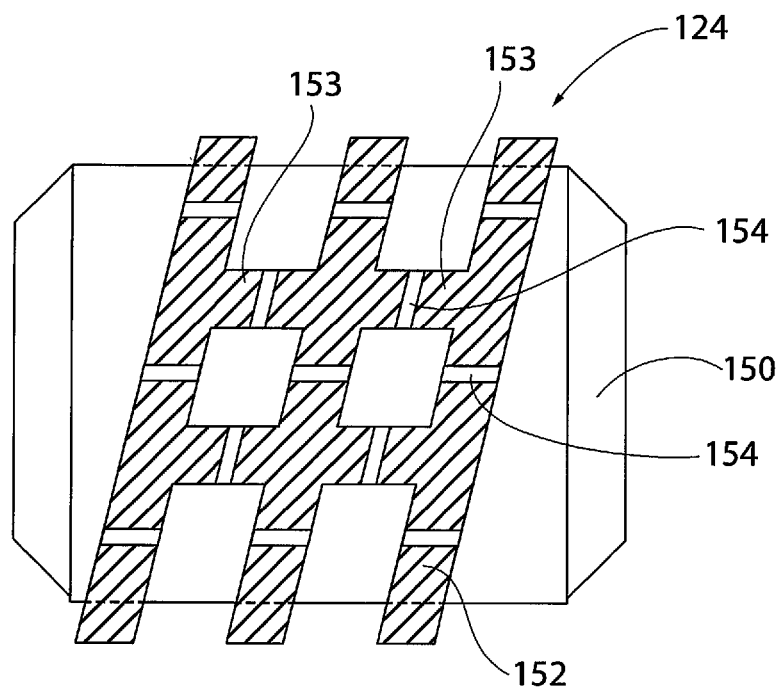
FIG. 6B is a side view of a mass and vibration absorbing layer of a dynamic absorber having a layer of a non-porous fluid restricting material with passageways extending therethrough.
Figure 7B:
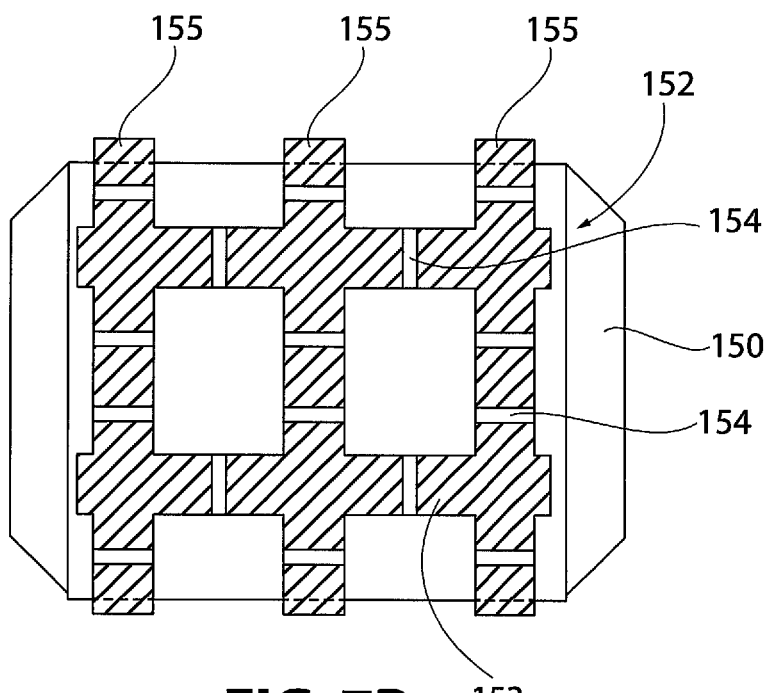
FIG. 7B is a side view of a mass and vibration absorbing layer of a dynamic absorber having a layer of a non-porous fluid restricting material with passageways extending therethrough

The fluid restricting material may, in the alternative, be non-porous. However, under these circumstances the non-porous material must have passageways extending therethrough to permit restricted flow of the fluid within the passageways. FIGS. 5B, 6B, and 7B illustrate embodiments identical to those in FIGS. 5A, 6A, and 7A with the exception that the layer 152 is non-porous and the passageways extend therethrough to permit restricted flow of the fluid within the passageways.

Figure 8A:
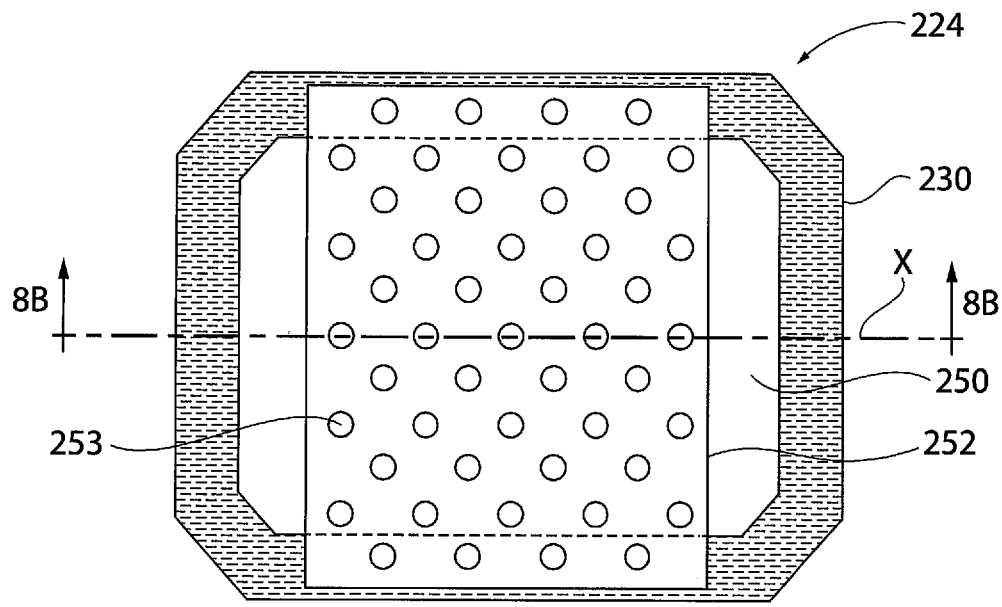
FIG. 8A is a top view of a portion of a tunable boring tool, according to another embodiment.
Figure 8B:
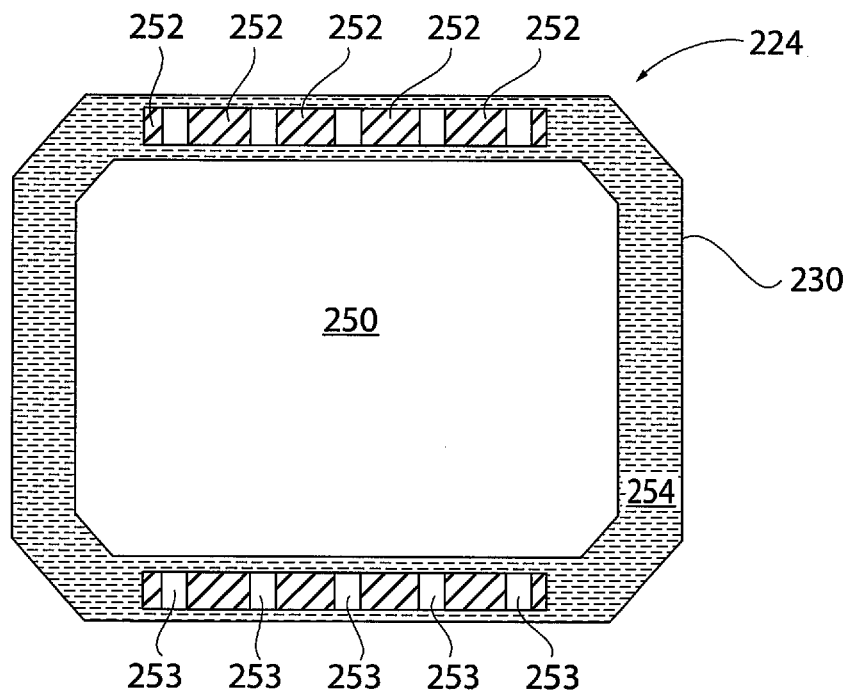
FIG. 8B is a cross section view of a portion of the tunable boring tool of FIG. 8A taken along arrows 8B-8B in FIG. 8A.

With reference to FIGS. 8A and 8B, an alternative embodiment of a dynamic vibration absorber 224 is illustrated. As in previous embodiments, the absorber 224 includes an absorber mass 250 and vibration absorbing layer 252. While it is possible for the layer 252 to be porous, the layer 252 may also be non-porous and include a plurality of radial channels 253 extending through the layer 252 from a central portion of the canister 230 an outer portion of the canister 230. As described above, the canister 230 is filled with a high viscosity fluid 254. As the mass 250 vibrates, the fluid 254 flows back and forth through the radial channels 253, thereby dampening vibration of the mass 250. The vibration absorbing layer 252 may be any sort of solid material. Unlike previously described embodiments, the vibration layer 252 need not be porous, however, it should be compressible and resilient. However, it is also possible for the later 252 to be made of a porous material and still include passageways extending therethrough. When the material is non-porous, the fluid 254 is not collected or absorbed into the layer 252 itself. For example, the vibration absorbing layer 252 may be formed from a gel, such as a cross-linked polymer material, or any sort of solid polymer. The channels 253 may be molded into the gel or polymer material. Alternatively, the channels 253 may be created after the solid material is formed by various etching or machining processes, as is known in the art. As in previously described embodiments, the absorber 224 may be interfaced with a tuning mechanism so that vibration frequency of the absorber 224 can be modified for use with boring bars of different lengths and vibration characteristics.

Figure 9:
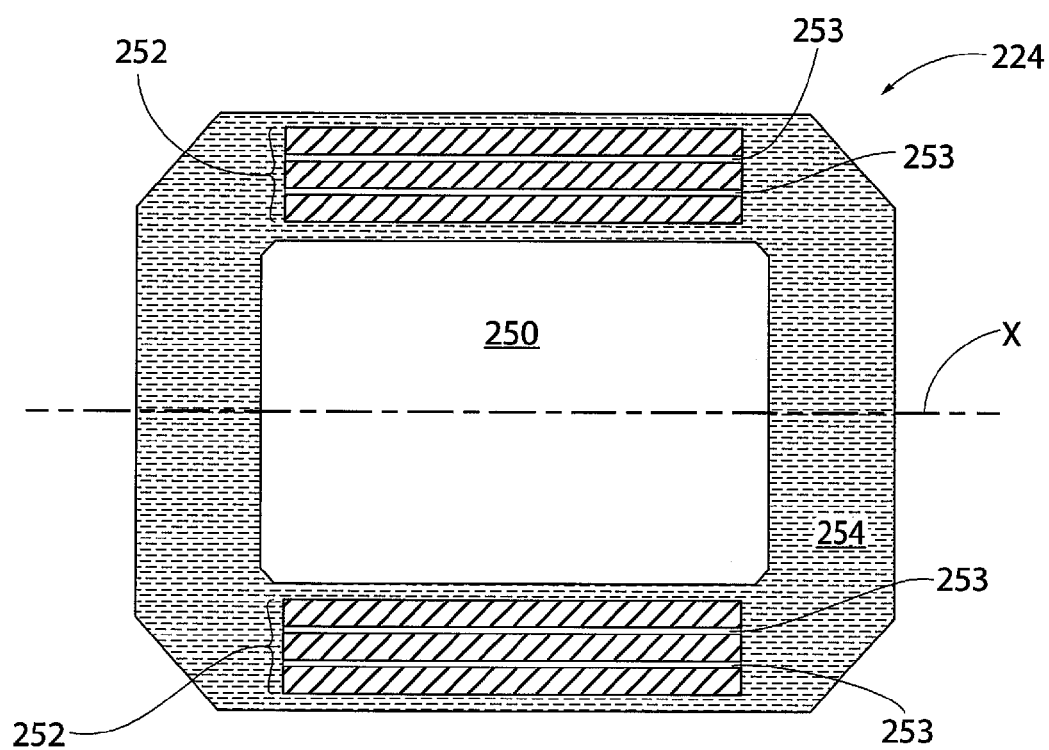
FIG. 9 is a cross section view of a portion of a tunable boring tool, according to another embodiment.

With reference to FIG. 9, a further embodiment of a dynamic vibration absorber 224 is illustrated. As with the embodiment of FIGS. 8A and 8B, the vibration absorbing layer 252 is a resilient and compressible layer which may be non-porous. The layer 252 includes longitudinal passageways 253a extending from a proximal end of the mass 250 to a distal end of the mass 250 and running substantially parallel with the longitudinal axis X of the mass 250. Fluid 254 passes in a back and forth direction through the longitudinal passageways 253a as the mass 250 oscillates. While FIG. 9 illustrates passageways that are longitudinally oriented, just as shown in FIGS. 5B, 6B, and 7B, the passageways may also be oriented in a direction perpendicular to the longitudinal axis X. Movement of fluid 254 absorbs vibration energy from the vibrating mass 250, thereby dampening vibration of the mass 250.

Figure 10:
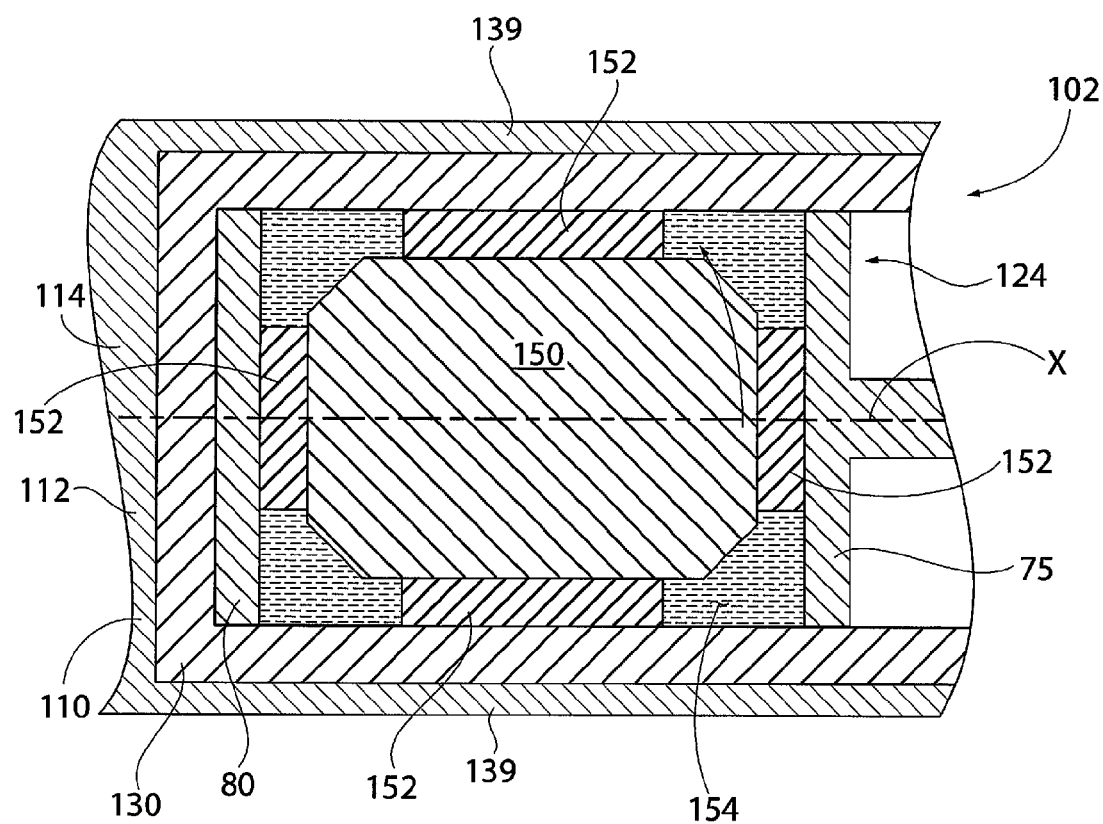
FIG. 10 is a cross section of a portion of a tuned boring tool, according to a further embodiment.

What has been described so far is an arrangement wherein the mass is supported at each end by resilient supports, as illustrated in FIG. 4. However, it is possible for the vibration absorber in accordance with the subject invention to operate without the resilient supports at each end. FIG. 10 is an identical arrangement to that of FIG. 4 except the resilient supports 165, 170 are removed and the pressure plates 75, 80 are reconfigured to accommodate additional layer 152 of fluid restricting material at opposing ends of the mass 150. As a result, the mass 150 is fully supported by the layer 152 of fluid restricting material. While FIG. 10 shows the layer 152 of porous material, it is entirely possible to introduce passageways in which the porous material is a non-porous material, as previously discussed. The arrangement illustrated in FIG. 10 is intended for a tuned absorber because the pressure plates 75, 80 are stationary. However, it is also possible for the pressure plates 75, 80 to be movable relative to one another in a configuration similar to that of FIG. 4 to provide for a tunable absorber mass.

Having generally described the structure of the invented boring bar and dynamic vibration absorber, the performance benefits of a dynamic vibration absorber optimized to cancel or minimize vibration of the second mode will now be discussed. More specifically, the present inventor has recognized that when the primary or first mode of a cantilever beam, such as a boring bar, is effectively dampened by a dynamic vibration absorber, the vibration of the second mode may become more significant or even dominant. Since the total amplitude of vibration of the bar is the summation of the amplitude from several modes, it may also be necessary to address vibration of the bar at the second mode to reduce chatter and improve performance.

Figure 11:
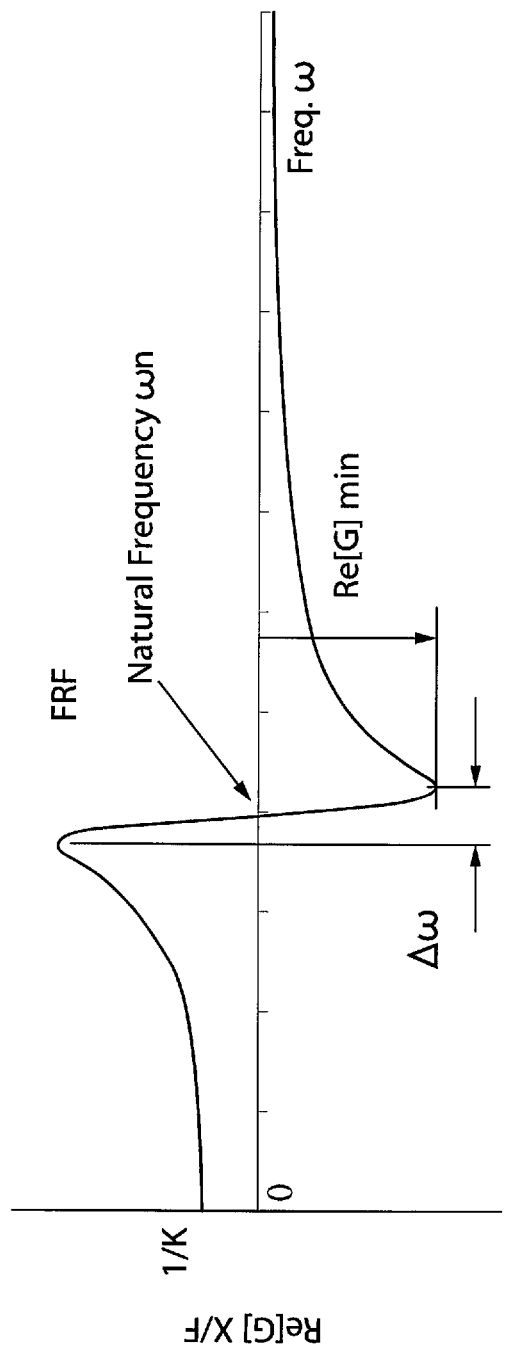
FIG. 11 is a line graph depicting the Frequency Response Function (FRF) for a vibrating bar, as is known in the prior art.

This principle is illustrated in FIG. 11, which depicts the first mode frequency response for a cantilever beam vibrating at the natural frequency. The equation for the minimum $(\text{Re}[G]_{min})$ and/or maximum $(\text{Re}[G]_{max})$ frequency response function (FRF) or transfer function of a vibrating bar, is reproduced below:

$$\text{Re}[G]_{max} = \frac{1}{4K\zeta(1-\zeta)} \text{ at } \omega = \omega_n(1-\zeta); \text{ and}$$

$$\text{Re}[G]_{min} = -\frac{1}{4K\zeta(1+\zeta)} \text{ at } \omega = \omega_n(1+\zeta).$$

A graphical representation of the FRF or transfer function is illustrated in FIG. 11.

The transfer function characterizes the dynamic response of a system in the frequency domain. It is a complex function that can be represented by real and imaginary components, or, alternatively, as amplitude and phase.

The minimum value of the real part of the transfer function ($\text{Re}[G]_{min}$) can be used to predict the dynamic stability of the boring bar during machining. Similarly, the maximum chip width (or depth of cut) for stable cut can be calculated from the equation:

$$b_{lim} = \frac{1}{2K_s\mu \text{Re}[G]_{min}}, \text{ wherein}$$

$K_s$ is the material cutting coefficient, $\mu$ is the force orientation factor, and $\text{Re}[G]_{min}$ is the value of the negative peak of the real component of the FRF.

By increasing the depth of cut, the metal removal rate can be increased, maximizing productivity. Therefore, it is desirable that the absolute value of $\text{Re}[G]_{min}$ be minimized.

The absolute value of $\text{Re}[G]_{min}$ may be minimized by adjusting the static stiffness K of the bar. Stiffness is defined as the force required to bend or deform a material a particular amount $$\left(\text{i.e., } \frac{\text{Force}}{\text{Displacement}}\right).$$

The dampening ratio is $\zeta$, which is equal to $$\frac{\Delta\omega}{2\omega_n}.$$

In the dampening ratio equation, $\Delta\omega$ is the difference in frequency between the frequency at which the maximum and minimum amplitude occur, specifically the difference in frequency between when $\text{Re}[G]_{max}$ and $\text{Re}[G]_{min}$ occur. The natural frequency of the bar is $\omega_n$. As can be seen from the $\text{Re}[G]_{min}$ equation, increasing the dampening ratio $\zeta$ for a vibrating cantilevered beam reduces the absolute value of the frequency response ($\text{Re}[G]_{min}$). Including materials within the vibrating bar that are capable of absorbing vibration energy, such as the vibration absorbing layer and high viscosity fluid discussed above, reduces the dampening ratio for the bar. In either case, reducing the absolute value of $\text{Re}[G]_{min}$ means that the amplitude of vibration of the first mode is effectively addressed. However, when a second order system for a vibrating cantilever beam is considered, the frequency response function includes two minimum values. As described above, the amplitude of the second mode is addressed by allowing the mass 150 of the dynamic vibration absorber 124 to oscillate such that the relative motion between the bar 110 and the mass in the region of the mass 150 is a rocking motion.

Including materials within the vibrating bar that are capable of absorbing vibration energy, such as the vibration absorbing layer and high viscosity fluid discussed above, reduces the dampening ratio for the bar.

Figure 12:
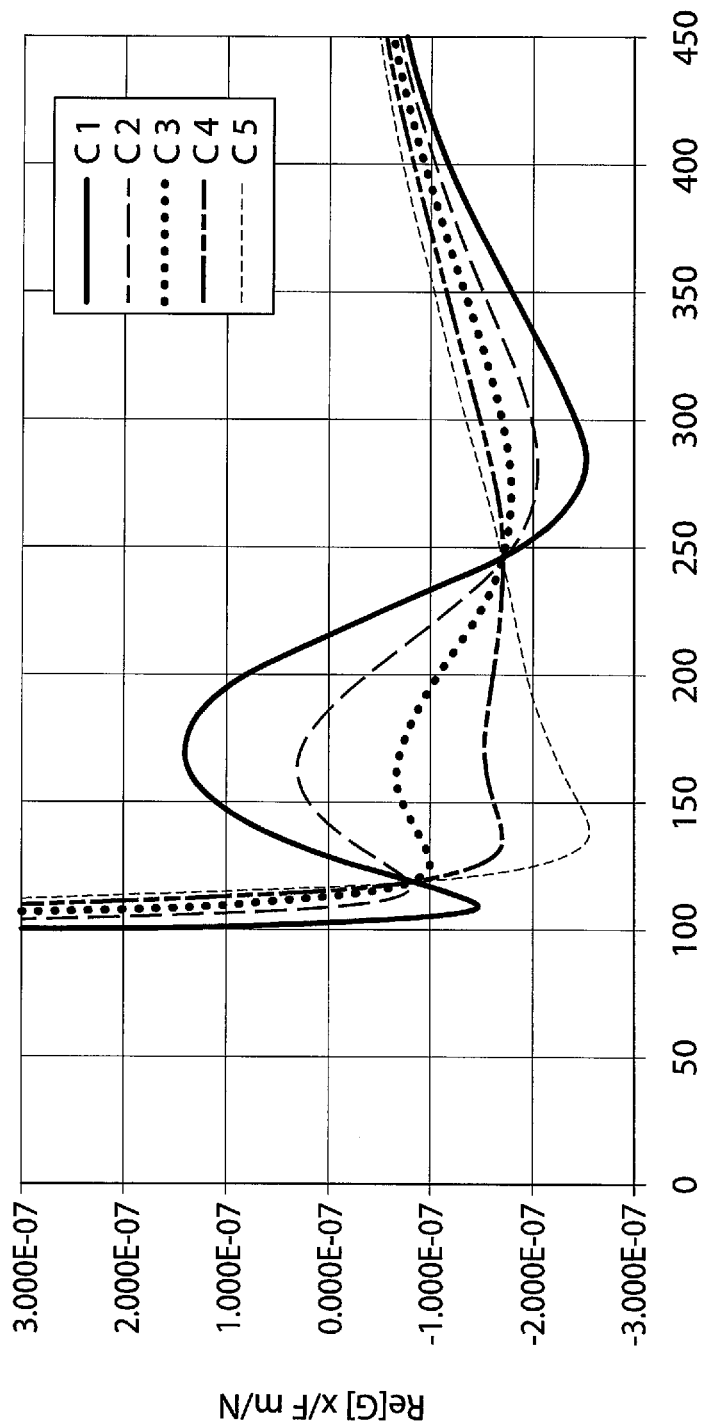
FIG. 12 is a line graph depicting the Frequency Response Function (FRF) for a vibrating bar having differing damping coefficient.
Figure 13:
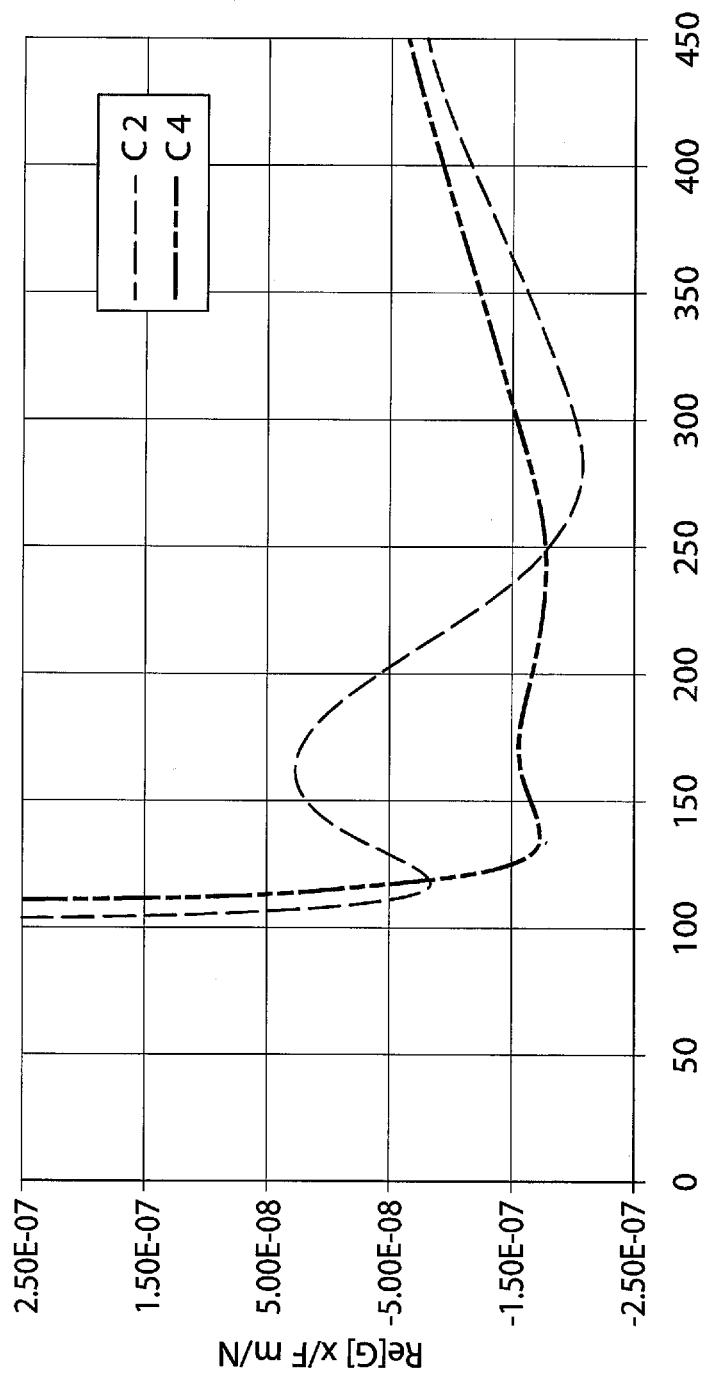
FIG. 13 is a line graph depicting the Frequency Response Function (FRF) for a vibrating bar having differing damping coefficient, but only for lines C2 and C4 from FIG. 12.

While FIG. 11 and the associated discussion provide theory associated with the subject invention, FIGS. 12 and 13 illustrate response curves for various damping coefficients to highlight the influence of damping and how much damping influences the response to vibration by the boring tool of the subject invention in particular. FIG. 13 is an illustration of lines C2 and C4 from FIG. 12 but illustrated separately from the collection of lines C1-C5 in FIG. 12. Directing attention to FIG. 12, for typical damping of a boring bar, line C2 illustrates the response to vibration. There is a significant peak C2P which then extends into a valley C2V. Line C1 shows the response for a damping value of 80% of that shown by line C2, while lines C3, C4, and C5 illustrate the response for damping values of 120%, 140%, and 160% to that for line C2 respectively. As illustrated in FIG. 13, the line C2 of typical damping is flattened when the damping value is 140% that of line C4. These lines are intended to illustrate a pattern of damping in the vibration response of a boring tool when the damping value is altered. Therefore, by selecting a fluid restricting material and the properties of such a material as discussed herein, the damping of a boring tool may be favorably influenced.

While several embodiments of the invention are shown in the accompanying figures and described hereinabove in detail, other embodiments will be apparent to, and readily made by, those skilled in the art without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive.

The invention claimed is:

1. A tuned or tunable boring tool comprising:
    a boring bar having a distal portion configured to support a tool, a proximal portion configured for attachment to a support structure of a metalworking machine, and a cylindrical body extending between the proximal portion and the distal portion, having an elongated cavity therein with fluid sealed within at least a portion of the cavity; and
    a tuned or tunable absorber within the cavity of the boring bar, the absorber comprising an absorber mass, an annular or partially annular support circumscribing each end of the absorber mass for holding the absorber mass within the cavity, and a layer of fluid restricting material surrounding at least a central portion of the absorber mass and immersed in the fluid, which in conjunction with the fluid, dampens vibration of the absorber mass,
    wherein the layer of fluid restricting material comprises a porous material having a plurality of open cells capable of being filled with fluid.

2. The tuned or tunable boring tool of claim 1, wherein the fluid is natural or synthetic oil.

3. The tuned or tunable boring tool of claim 1, wherein the layer of fluid restricting material is a foam, a gel, a cross-linked polymer, or a porous solid material.

4. The tuned or tunable boring tool of claim 1, wherein the layer of fluid restricting material comprises a non-porous material having a plurality of channels extending through the layer.

5. The tuned or tunable boring tool of claim 4, wherein the plurality of channels are molded in the layer of fluid restricting material.

6. The tuned or tunable boring tool of claim 1, wherein the layer of fluid restricting material comprises a plurality of interconnected strips surrounding portions of the absorber mass to form a plurality of connected annular rings surrounding the outer surface of the mass.

7. The tuned or tunable boring tool of claim 1, wherein the layer of fluid restricting material comprises a strip wrapped around at least a portion of the mass in a helical pattern.

8. The tuned or tunable boring tool of claim 1, further comprising a cutting element attached to the distal end of the bar.

9. The tuned or tunable boring tool of claim 1, wherein the annular or partially annular supports comprise an elastic material.

10. The tuned or tunable boring tool of claim 1, further comprising a tuning mechanism associated with one of the annular or partially annular supports for tuning the absorber to a desired vibration frequency.

11. The tuned or tunable boring tool of claim 1, wherein the absorber mass and vibration absorbing layer are enclosed within a canister within the cavity, wherein the canister is filled with fluid.

12. A tuned boring tool comprising:
a boring bar having a distal portion configured to support a tool, a proximal portion configured for attachment to a support structure of a metalworking machine, and a cylindrical body extending between the proximal portion and the distal portion, having an elongated cavity therein with fluid sealed within at least a portion of the cavity; and
a tuned absorber within the cavity of the boring bar, the absorber comprising an absorber mass and a layer of fluid restricting material surrounding at least a central portion and the opposing ends of the absorber mass and immersed in the fluid, which in conjunction with the fluid, dampens vibration of the absorber mass,
wherein the layer of fluid restricting material comprises a porous material having a plurality of open cells capable of being filled with fluid.

13. A method of forming a tuned or tunable boring bar, the method comprising:
providing a boring bar having a distal portion configured to support a tool, a proximal portion configured for attachment to a support structure of a metalworking machine, and a cylindrical body extending between the proximal portion and the distal portion, having an elongated cavity therein;
providing a tuned or tunable vibration absorber comprising an absorber mass, an annular or partially annular support circumscribing each end of the absorber mass for holding the absorber mass within the cavity, and a layer of fluid restricting material surrounding at least a central portion of the absorber mass;
filling the cavity with fluid;
mounting the vibration absorber into the cavity of the boring bar;
mounting a cutting tool to the distal end of the boring bar; and
securing the proximal end of the boring bar to a mounting structure of a metalworking machine;
wherein, upon vibration of the boring bar, fluid provided within the cavity of the boring bar passes back and forth through the fluid restricting material as the absorber mass vibrates; and
wherein the layer of fluid restricting material comprises a porous material having a plurality of open cells capable of being filled with fluid.

14. The method of claim 13, wherein the layer of fluid restricting material is porous and comprises a sponge, a gel, a foam, or any combination thereof.

15. The method of claim 13, further comprising attaching a tuning mechanism to the boring tool, such that the tuning mechanism compresses the at least one support, thereby tuning the absorber to a desired vibration frequency.

16. A method of forming a tuned boring tool, the method comprising:
providing a boring bar having a distal portion configured to support a tool, a proximal portion configured for attachment to a support structure of a metalworking machine, and a cylindrical body extending between the proximal portion and the distal portion, having an elongated cavity therein;
providing a tuned vibration absorber comprising an absorber mass within the cavity, and a layer of fluid restricting material surrounding at least a central portion and opposing ends of the absorber mass;
filling the cavity with fluid;
mounting the vibration absorber into the cavity of the boring bar;
mounting a cutting tool to the distal end of the boring bar; and
securing the proximal end of the boring bar to a mounting structure of a metalworking machine;
wherein, upon vibration of the boring bar, fluid provided within the cavity of the boring bar passes back and forth through the fluid restricting material as the absorber mass vibrates; and
wherein the layer of fluid restricting material comprises a porous material having a plurality of open cells capable of being filled with fluid.

* * * * *